United States Patent [19]

Buelens et al.

[11] Patent Number: 4,993,698
[45] Date of Patent: Feb. 19, 1991

[54] FILM MAGAZINE

[75] Inventors: Edward Buelens, Kontich; Danny Van Geyte, Wilrijk, both of Belgium; Hubert Hackenberg, Holzkirchen, Fed. Rep. of Germany

[73] Assignee: AGFA-Gevaert, N.V., Mortsel, Belgium

[21] Appl. No.: 452,306

[22] Filed: Dec. 19, 1989

[30] Foreign Application Priority Data

Dec. 20, 1988 [EP] European Pat. Off. ........ 88202971.3

[51] Int. Cl.⁵ .............................................. B65H 1/00
[52] U.S. Cl. ...................................... 271/145; 271/167
[58] Field of Search ............... 271/167, 160, 147, 145; 206/454, 455

[56] References Cited

U.S. PATENT DOCUMENTS 3,565,421  2/1971  Barker et al. .................... 271/145 X
4,502,677  3/1985  Senga et al. ........................ 271/104
4,815,721  3/1989  Morgan ........................... 271/104 X

FOREIGN PATENT DOCUMENTS 0080798   6/1983  European Pat. Off. .
0271610   6/1988  European Pat. Off. .
52832     4/1980  Japan .................... 271/167
43743     3/1984  Japan .................... 271/145
244718   12/1985  Japan .................... 271/145

Primary Examiner—David H. Bollinger
Attorney, Agent, or Firm—William J. Daniel

[57] ABSTRACT

A light-tight magazine for dispensing recording sheets one by one from a stack in which the sheets are separated from each other by intervening spacing foils (17), the spacing foils being held against removal from the magazine by means of ear portions (20, 21) that protrude laterally beyond the sides of the stack and are engaged by means of fixed abutment walls (27, 28) in the magazine interior.

15 Claims, 3 Drawing Sheets

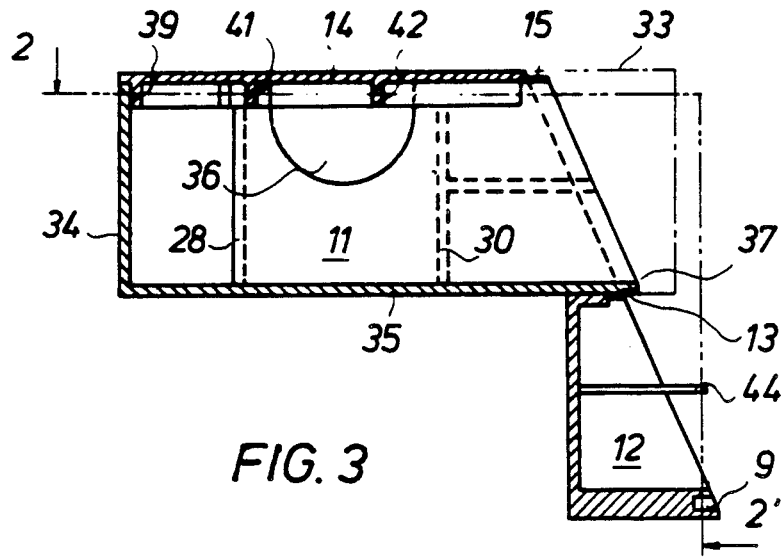
FIG. 3
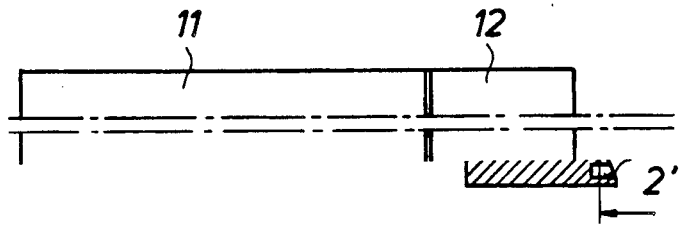
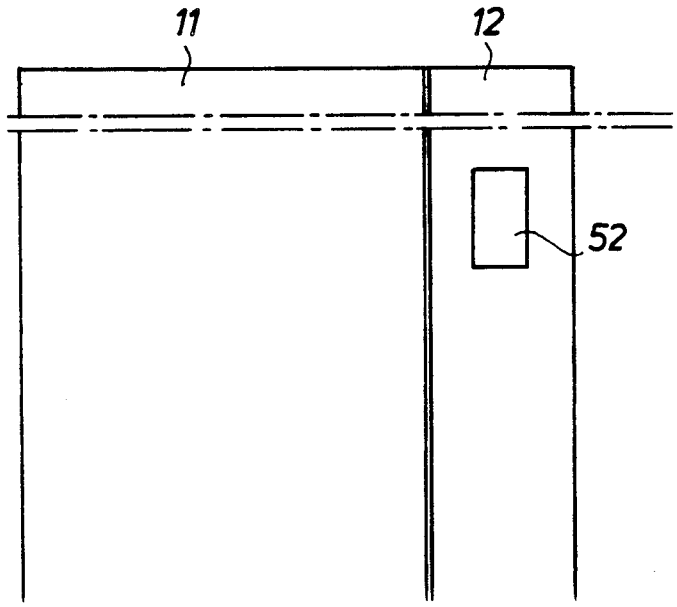

FILM MAGAZINE

BACKGROUND OF THE INVENTION

1. Field of the invention

The present invention relates to the feeding from a stack in a magazine of light-sensitive image recording sheets, in particular the feeding of microfilms to an apparatus for the exposure of documents or other information on a reduced scale onto microfiches.

2. Description of the prior art

In the feeding of recording sheets one at a time from a stack of such sheets contained in a magazine or the like to a given position, e.g. a position in an exposure station for the image-wise exposure of the sheets, it is known to prevent damage to the recording surface of the sheets and also to exclude double feeding, by keeping the sheets in the stack mutually separated by means of separating sheets (hereinafter called "spacing foils") that usually are made from a flexible material, such as paper, polyethylene and the like, and by fixing or gripping the trailing end portions of such spacing foils i.e. the end portions opposite to the feeding direction, so that these foils are not fed together with the recording sheets.

A method for feeding in this fashion is disclosed in EU Al 0 080 798, and is based on the holding of the trailing ends of the spacing foils extending beyond the corresponding ends of the image recording sheets, by means of retaining rods passing through corresponding holes in such trailing end portions.

The retaining of foils by means of rods is delicate since the rods can easily become bent or misaligned in one or another way whereby the satisfactory fitting of the foils on the rods may become troublesome.

Further, the staggered position of the trailing ends of the image recording sheets and of the spacing sheets is a disadvantage, since the position of the image recording sheets is not very well controlled thereby in the holder or magazine which the sheets are stacked. Moreover, the reliable loading in the dark of a holder with sheets the edges of which do not coincide is difficult.

SUMMARY OF THE INVENTION

Objects of the Invention

An object of the invention is to provide a light-tight magazine comprising a stack of alternately piled light-sensitive image recording sheets and spacing foils, which is easy to load by the manufacturer of the magazine, and which allows the reliable withdrawal of the image recording sheets, one by one, while excluding the foils from withdrawal.

A further object of the invention is to provide a magazine which allows the easy removal of the spacing foils after all the image recording sheets have been withdrawn, so that the empty magazine may be used as a storage box for the processed image recording sheets.

A further object of the invention is to provide a method of feeding image recording sheets from a stack with interleaving spacing foils, in which the locking of the position of the spacing foils is simpler than according to the techniques known in the art.

Statement of invention

According to the present invention, a light-tight magazine comprising a stack of alternately piled light-sensitive image recording sheets and spacing foils, the trailing end portions of the spacing foils being held with respect to the magazine whereby said foils are not fed while an image recording sheet is fed, and the leading end portions of the separating foils having a cut away portion for enabling contact of a feed means with an image recording sheet for the feeding of such image recording sheet to a given position, is characterized in that the trailing end portions or tabs of the spacing foils are provided with ear portions protruding laterally of the side edges of the image recording sheets, and that walls of the magazine are provided with retaining or detent means for retaining said ear portions.

In a suitable form of the magazine according to the invention, the retaining means can take the form of small wall sections protruding inwardly from the lateral walls of the magazine. The wall sections may also make part of chambers or compartments in the magazine that are arranged for containing a moisture absorbing ingredient i.e. desiccant. The walls of such subchambers may serve to laterally support the image recording sheets and the separating foils in the stack, and in a further suitable embodiment of the invention, the lateral edges of the film sheets and the spacing foils coincide with each other, apart from the retaining tabs of the foils.

The present invention includes also a method of feeding interleaved recording sheets.

According to the method aspect of the present invention, a method of feeding light-sensitive image recording sheets comprising the steps of piling alternately in a stack on a supporting base a plurality of flexible image recording sheets and a plurality of flexible spacing foils, gripping portions of the spacing foils to thereby prevent said foils from being removed from the stack, engaging one end portion of the upper image recording sheet in the stack by a feed means through a cut away portion in the same end portion of any overlying spacing foils, and removing such image recording sheet from the stack for delivery to a subsequent position, is characterized in that the gripping of portions of the spacing foils occurs by providing said foils with ear portions protruding laterally of the image recording sheets, and engaging said ear portions by means of detent means.

The protruding ear portions easily enable the engaging of the spacing foils by means of ribs, tongues, abutments or the like that may form an integral part of a holder in which the sheets are stacked.

According to a preferred feature of the method according to the invention, the opposite end edges of the image recording sheets and the spacing foils coincide, which facilitates the handling of a stack of sheets in the manufacturing process.

According to another preferred feature of the method according to the invention, also the lateral or side edges of the image receiving sheets and the spacing foils coincide with each other, except for the protruding ears. This feature ensures a good control of the position of the stack of sheets in an appropriate holder by means of lateral supporting means in the holder.

In another suitable embodiment, all of the edges of the film sheets and the spacing foils coincide with each other, so that the sheets and foils may constitute a truely rectangular stack, except for the ears of the foils, which readily lends itself to handling and manipulation for the loading of a magazine.

BRIEF DESCRIPTION OF THE DRAWINGS

The invention will be described hereinafter by way of one example with reference to the accompanying drawings wherein:

FIG. 3 is a sectional view of the magazine on line 3—3' of FIG. 1, FIG. 4 is a top view of the closed magazine.

Referring to FIG. 1 which illustrates one embodiment of a magazine according to the invention, the magazine being located in a horizontal position and an end closure or door being opened and hanging downwardly, and to FIG. 2, which illustrates a horizontal sectional view of the magazine according to line 2—2 of FIG. 3, with the cover removed, the magazine comprises a generally rectangular box 11 and end door 12 which are interconnected by a hinge 13. The magazine is preferably manufactured by injection moulding from suitable plastics, such as black-pigmented polypropylene, ABS, polystyrene, and the like and the hinge may be integrally moulded together with the box and the end door.

Figure 1:
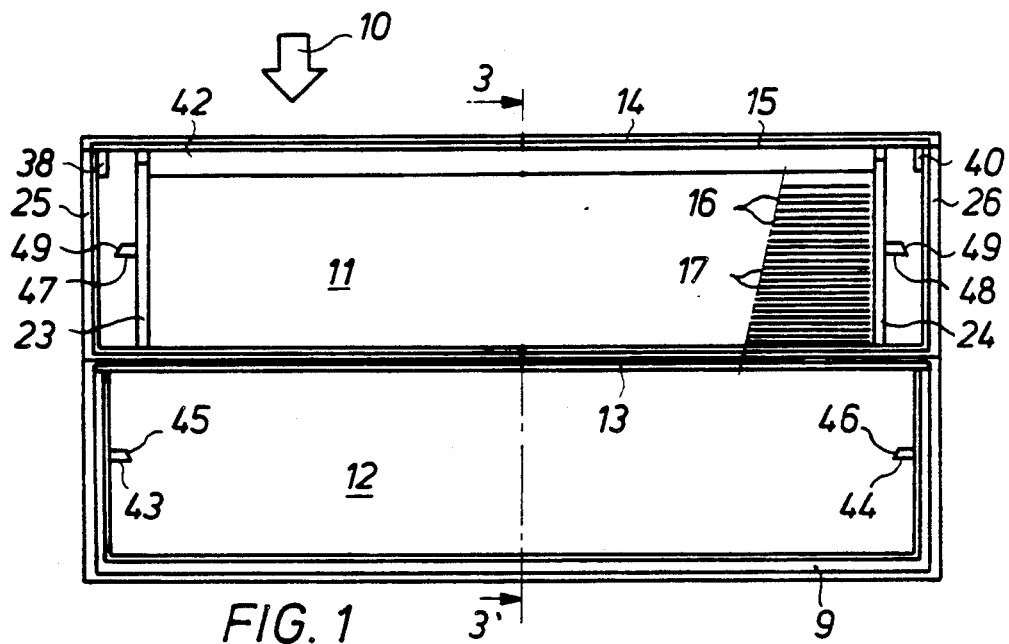
FIG. 1 is a front view of one embodiment of a magazine according to the invention, the lid being opened.

The box 11 also has a separate top cover 14 that allows the loading of the box. The cover may be arranged for permanent sealing to the box, but it may also be fitted in a removable way in order to allow the reloading of an empty magazine by the end-user.

The end door 12 is provided with a peripheral groove 9 which fits over a peripheral tongue 15 of the box so that the magazine can form a light-tight receptable for unexposed light-sensitive film sheets.

Figure 2:
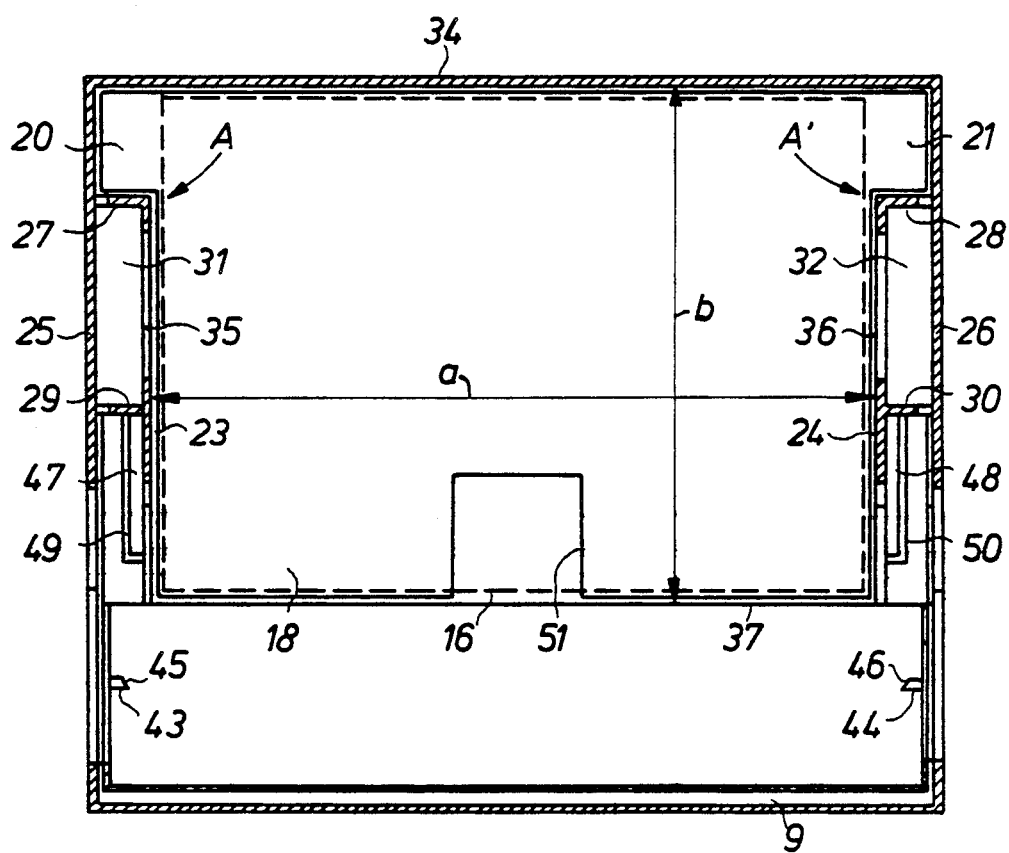
FIG. 2 is a sectional view of the magazine on line 2—2' of FIG. 3.

These film sheets are arranged in a stack as illustrated by the odd lines 16 in FIG. 1, in alternating relation with the interleaving spacing foils as illustrated by the even lines 17. A freely-movable platen 18 (see FIG. 5) rests freely on-top of the stack of sheets. For reasons of clarity, only a fragment of the sheets has been illustrated in FIG. 1. For the same reason, the clearance between the edges of the sheets and the adjacent walls of the magazine, see also FIG. 2 has been exaggerated. The film sheets 16 are rectangular sheets, as represented by the rectangle in broken lines in FIG. 2. The spacing foils 17 have a format that corresponds with that of the platen 18, seen in plan in FIG. 2 and thus the foils 17 have ears 20 and 21 which in fact are square lateral extensions of the foils at their trailing end adjacent end closure 12, and a cut away portion 51 at their leading end adjacent end closure 12.

The magazine is now described in further detail with reference to FIGS. 1 to 5.

The box 11 has inside walls 23 and 24 that run parallel with the exterior side walls 25 and 26, and that rise over the complete height of the box. The inside walls 23 and 24 are connected with the exterior side walls 25 and 26 by perpendicular wall sections 27 through 30 whereby two small chambers 31 and 32 are formed. The walls 23 and 24 are provided with large openings 35 and 36 through which the chambers 31 and 32 communicate with the main interior of the box. The distance a between the walls 23 and 24 and the distance b from the rear wall 34 up to the leading edge 37 of the bottom wall 35 of the box are related to the length and the width of the film sheets. It should be understood that in practice the corresponding dimensions of the sheets are by some tenths of a millimetre smaller than the corresponding distances a and b.

The top cover 14 of the box is a separately moulded member which is basically a flat plate having peripheral ribs 38, 39 and 40, and transverse reinforcing ribs such as 41 and 42. The cover light-tightly fits on the open box and may either permanently or removably secured thereto.

The end closure lid 12 of the box is provided with two ribs 43 and 44 on the interior surface of its lateral walls. The ribs extend beyond the perimeter of the opening of the lid, as may be seen in FIG. 3 for the rib 44, and the ribs are provided with bevelled faces 45 and 46. The closed position of the lid is indicated in FIG. 3 by the broken line 33.

The box of the magazine is provided with two locking ridges 47 and 48 moulded on the exterior surfaces of interior lateral walls 23 and 24. The ridges have slanting faces 49 and 50, and they form the other half of the co-operating locking means for the end closure. The general direction of the described ribs and ridges is parallel with the bottom 35 of the magazine, and in this way they enable the easy unmoulding of the magazine, without having to resort to moulds that comprise different, independently moving parts. More information about the illustrated locking ribs may be found in EP-A-87 200 614.4 relating to an injection-moulded generally rectangular light-tight container.

Figure 5:
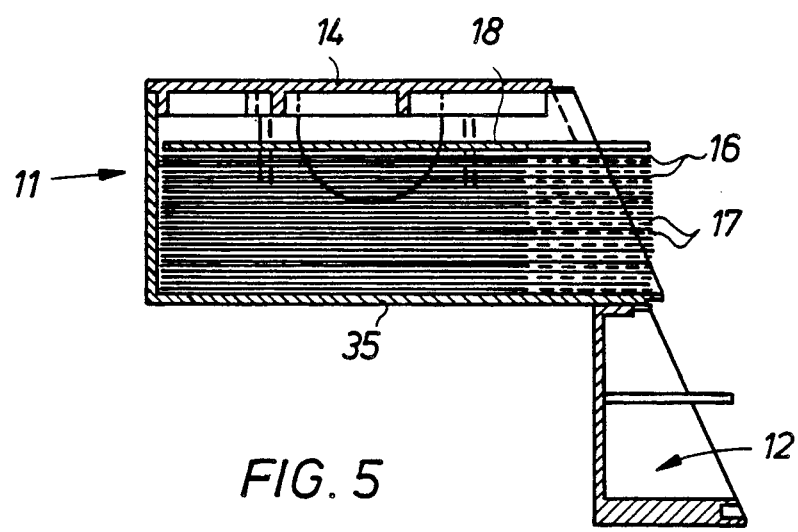
FIG. 5 is a sectional view similar to that of FIG. 3, wherein a stack of sheets is shown diagrammatically.

FIG. 5 illustrates in a diagrammatic way the magazine loaded with light-sensitive material. The load comprises a stack of film sheets 16 that are separated from each other by spacing foils 17. The peripheral edges of the film sheets coincide with the edges of the spacing foils, except for the ears 20, 21 (see FIG. 2). In this way the film sheets and the spacing foils form a rectangular block with flat side faces, which can readily he manipulated for its transport from a stacking mechanism into the opened magazine. The right-hand broken line sections of the spacing sheets represent the rectangular cut out portions 51 of the sheets. The stack of film sheets and spacing foils is loaded thru the top opening of the magazine, the ear portions 20 and 21 of the spacing foils fitting in the spaces between the rear wall 34 and the corresponding perpendicular inner wall; sections 27 and 28 of the magazine. The latter thus constitute abutments or detent surfaces which block the movement of the foils thru the open front end of the magazine.

Then the platen 18 is placed on top of the stack of sheets, the ear portions of the platen fitting likewise behind the walls 27 and 28. The platen creates a downward bias which causes a straightening of occasionally curved film and spacing sheets, and produces also a certain friction between each film sheet and the adjacent spacing foils.

The top cover 14 is placed on the box, the end closure 12 is closed and sealed with a tape or the like to avoid inadvertant opening of the magazine, and finally the similar magazine may be packed together with a number of magazines in a dispatch container or carton.

The end-user of the magazine removes the seal from the end closure lid, and carefully places the magazine in an apparatus in which the opening of the lid by a hook or similar means engaging a recess 52 (see FIG. 4) in the closure, and the dispensing of the sheets one-by-one may occur automatically with a view to the image-wise exposure of the sheets.

A suitable apparatus for carrying out the imagewise exposure of the film sheets and for processing them, is disclosed in EP-Al-0 271 610.

The actual dispensing of the film sheets from the magazine may occur by any system known in the art. Common dispensing mechanisms comprise a resilient finger, roller, or the like which is moved cyclically over the front portion of the upper film sheet which is accessible through the opening 51 in the platen 18, and which is operated to frictionally engage said front portion and to urge thereby the top film sheet forwardly thru the open end. As the film sheet has been advanced over some centimeters it may be engaged by one or a plurality of drive roller pairs for further transport to an exposure station, etc. During the dispensing of the film sheet, a bias may be applied by the dispensing member also on the next, or on some of the next film sheets at the area corresponding with the opening 51. Yet such next film sheet(s) is (are) not dispensed together with the first one, since the spacing foils 17 have a frictional engagement with the film sheets 16 that exceeds the frictional engagement of the film sheets with each other at their leading ends.

For the dispensing of the next film sheet, the dispensing member reaches through the opening 51 of the platen 18 and through the corresponding opening of the first spacing foil, in order to contact such next film sheet.

This operation is repeated for every next film sheet, it being understood that the number of spacing foils on top of the remaining film sheets increases during the dispensing of the film sheets. The platen 18 keeps the stack of spacing foils 17 well flat, even after the relatively stiffer film sheets have been removed.

The filmless magazine may then be removed from the exposure apparatus, and the stack of the remaining spacing foils 17 may be removed by a simple pull on the leading ends of such sheets, which causes the ear portions of these sheets to become deflected and to slip from behind the walls sections 27 and 28. The sheet ears are capable of undergoing such flexure, because the removal of the film sheets caused an increased flexibility of the spacing foils since now also their areas adjacent to the ears are capable to become flexed. The described removal of the spacing foils may occassionally also be done in two or more sub-packets.

The film sheets that in the meantime have been exposed and processed to provide an image, may occasionally be re-introduced into the magazine which at that moment may operate as a storage magazine for the exposed film sheets. The presence of the platen 18 does not interfere with such use. On the contrary, the opening at the leading end of the platen may facilitate even the gripping of a stack of re-introduced film sheets by allowing finger access at the underside of the stack.

A magazine was produced in accordance with the described embodiment, which comprised 100 microfilm sheets, with a polyethylene terephthalate filmbase with a thickness of 0.17 mm, measuring 10.5 by 14.8 cm, and which were separated by spacing foils made from black-pigmented polyethylene terephthalate with a thickness of 0.110 mm.

The present invention is not limited to the described embodiment.

The ear portions of the spacing foils may have other shapes than the illustrated ones, and they may also be located at other positions than the illustrated ones, e.g. halfway the length of the foils, or at two or more locations at each foil side.

The dispensing of the light-sensitive sheets may occur by means of sucker cups, sucker rollers and the like.

The ears of the spacing foils may be arranged for facilitating their yielding release when the stack of spacing foils is to he pulled out from the magazine. According to one embodiment, the ears may be partially slitted in order to promote their flexing. According to another embodiment the ears may have rounded-off corners at positions indicated by A and A' in FIG. 2, in order lo produce a contact pressure that gradually increases up from the bases of the ears, as the spacing foils are pulled out.

We claim:

1. In a light-tight magazine (10) for a stack of alternatively piled image light-sensitive recording sheets (16) and spacing foils (17), and having an openable end thru which the recording sheet can be dispensed one by one, the end portions of the spacing foils remote from said openable end being held with respect to the magazine to prevent said foils from being dispensed simultaneously with an image recording sheet, and the end portions of the spacing foils adjacent said openable end each having a cut-away portion (51) to allow a feeding means to have access to the uppermost image recording sheet of the stack for the dispensing of such image recording sheet to a subsequent position, in combination, the improvement wherein said remote end portions of the spacing foils (17) are provided with ear portions (20, 21) protruding laterally beyond the side edges of the stacked image recording sheets, and said magazine has opposite lateral walls (23, 24) with interior abutment means (27, 28) for engaging said ear portions to retain said foils within the magazine while said recording sheets are dispensed.

2. A magazine according to claim 1, wherein a rigid platen (18) is placed on top of the stack of interleaved sheets and spacing foils, for biasing said stack.

3. A magazine according to claim 2, wherein the shape in plan of said platen (18) corresponds generally with that of the flexible foils.

4. A magazine according to claim 1, wherein the format of the recording sheets (16) corresponds with that of the spacing foils (17), except for the protruding ear portions (20,21).

5. A magazine according to claim 1, wherein the protruding ear portions (20,21) have a rectangular form.

6. A magazine according to claim 1, wherein the interior abutment means are in the form of small wall sections (27,28) projecting inwardly from the lateral walls of the magazine.

7. A magazine according to claim 7, wherein said small wall sections (27,28) make part of the walls of hollow chambers (31,32) in the magazine containing a moisture absorbing means.

8. A magazine according to claim 7, wherein said chambers (31,32) have wall sections (23,24) for laterally supporting the stack of image recording sheets (16) and the spacing foils (17).

9. A magazine according to claim 1, which comprises a light-tight end closure (12) which is arranged for being opened after the magazine has been inserted in a image processing apparatus.

10. A magazine according to claim 1, wherein the remote end edges of said spacing foils and the corresponding remote end edges of the recording sheets coincide.

11. In a method of dispensing light-sensitive image recording sheets one by one from a stack comprising the steps of piling alternately on a supporting base (35) a plurality of flexible image recording sheets (16) and a plurality of flexible spacing foils (17), engaging portions of the spacing foils to retain said foils in said stack while the image recording sheets removed therefrom, gripping one end portion of the uppermost image recording sheet by a feeding means through an access opening provided in the corresponding end portion of any overlying spacing foils, and dispensing the thus gripped image recording sheet from the stack to a subsequent position in combination, the improvement wherein the engaging of said portions of the spacing foils (17) occurs by providing said foils with ear portions (20, 21) protruding laterally beyond the side edges of said image recording sheets (16), and blocking the passage of said portions by means of detent surfaces (27, 28).

12. A method of dispensing image recording sheets according to claim 11, wherein the edges of the image recording sheets and the spacing foils on at least two opposite sides of the stack generally coincide with each other.

13. A method of dispensing image recording sheets according to claim 11, wherein the edges of the image recording sheets (16) coincide with the edges of the spacing foils on all four sides of the stack, except for the protruding ear portions.

14. A method according to claim 11, comprising removing the spacing foils (17) after the image recording sheets (16) have been removed, by forcibly pulling the spacing foils (17) as a group past said detent surfaces.

15. A method according to claim 11, comprising increasing the resistance against upward flexing of the ear portions of the spacing foils, by superposing on the top foil a rigid platen similar in plan shape to the flexible foils.

* * * * *